(12) United States Patent
Lu et al.

(10) Patent No.: US 7,473,732 B2
(45) Date of Patent: Jan. 6, 2009

(54) HIGH-GLOSS ROOM TEMPERATURE CURABLE WATER-BASED MOLD RELEASE AGENT

(75) Inventors: Zheng Lu, Brentwood, NH (US); Gary K. Shank, Methuen, MA (US); Tamara L. Harmer, Kingston, NH (US)

(73) Assignee: Henkel Corporation, Rocky Hill, CT (US)

( * ) Notice: Subject to any disclaimer, the term of this patent is extended or adjusted under 35 U.S.C. 154(b) by 526 days.

(21) Appl. No.: 10/522,843

(22) PCT Filed: Sep. 10, 2003

(86) PCT No.: PCT/US03/28270

§ 371 (c)(1),
(2), (4) Date: Jan. 28, 2005

(87) PCT Pub. No.: WO2004/024822

PCT Pub. Date: Mar. 25, 2004

(65) Prior Publication Data

US 2006/0102050 A1     May 18, 2006

(51) Int. Cl.
*C08L 83/06*     (2006.01)

(52) U.S. Cl. .................. 524/837; 524/501; 525/477; 106/287.11; 106/287.12; 544/180

(58) Field of Classification Search .............. 524/837, 524/501; 525/477; 106/287.11, 287.12; 544/180
See application file for complete search history.

(56) References Cited

U.S. PATENT DOCUMENTS

| 5,000,861 | A | * | 3/1991 | Yang | 428/391 |
| 5,075,403 | A | | 12/1991 | Kirk | 528/15 |
| 5,536,537 | A | | 7/1996 | Mizushima et al. | 427/387 |
| 5,916,992 | A | * | 6/1999 | Wilt et al. | 528/15 |
| 6,294,007 | B1 | * | 9/2001 | Martin | 106/38.22 |
| 6,329,060 | B1 | * | 12/2001 | Barkac et al. | 428/423.1 |

OTHER PUBLICATIONS

Freeman, Silicones, Published for the Plastics Institute (1962), p. 27.*

* cited by examiner

*Primary Examiner*—Kuo-Liang Peng
(74) *Attorney, Agent, or Firm*—Steven C. Bauman

(57) ABSTRACT

A room temperature curable water-based semi-permanent mold release agent is provided that is effective to facilitate the release of multiple successively molded polymer (such as polyester) parts following a single application of the mold release agent to the mold surface. The mold release agent preferably is effective to set within 1 hour of application to a mold release surface at 5-40° C., and to cure at the same temperature within 1-8 hours of application. The mold release agent is substantially devoid of VOCs, and therefore has no flash point.

34 Claims, No Drawings

HIGH-GLOSS ROOM TEMPERATURE CURABLE WATER-BASED MOLD RELEASE AGENT

BACKGROUND OF THE INVENTION

1. Field of the Invention

The present invention relates to mold release agents. More particularly, it relates to a semi-permanent water-based mold release agent.

2. Description of Related Art

Molding is a well known technique for producing finished parts made from plastics, polyester and other polymeric materials. Currently, molded parts range from bicycle helmets to boat hulls to telephone receiver handsets and beyond.

Molding is performed by processing (e.g. pouring, injecting, spraying, etc.) a liquid resin, or a reinforcing material (such as fiber reinforcing material) and a liquid resin, into a mold cavity or onto a mold surface and then curing the resin to provide a finished solid part conforming to the cavity or surface. In order to prevent the finished molded part from sticking to the mold surface, a mold release agent is applied to the surface prior to pouring the resin.

There are two basic types of mold release agent, sacrificial and semi-permanent. A sacrificial mold release agent is one that is consumed or otherwise completely depleted after a single molded part is made in the mold, and must be reapplied prior to making each molded part. For this reason, sacrificial mold release agents are costly and cumbersome to use.

Semi-permanent mold release agents are also applied to the mold surface. They can be of the wipe-on or spray-on type. These release agents are preferred because they are not completely depleted following a single molding operation. A single semi-permanent mold release agent application can be used to facilitate the release of multiple successive molded parts without reapplication of the release agent; e.g. up to 5, 10, 15, 20, 25, 30 or more releases.

Conventionally, room temperature curing semi-permanent mold release agents, e.g. for room temperature molding applications (epoxy-based or polyester-based composites), have been solvent based; that is they contain significant amounts of volatile organic compounds (VOCs), and have relatively low flash points and high vapor pressures. Existing solvent based mold release agents present significant health and safety hazards, both in use and transport.

There is a need in the art for a non-solvent based semi-permanent mold release agent, which is preferably water based, and does not suffer from the drawbacks mentioned above.

SUMMARY OF THE INVENTION

A mold release agent is provided. The mold release agent has 0.003-2 weight percent amine-functional silicone and 0.001-2 weight percent hydroxy-functional silicone. The amine- and hydroxy-functional silicones are dispersed in a water carrier phase.

A mold release agent is also provided having at least one functional silicone dispersed in a water carrier phase, where the mold release agent is substantially devoid of VOCs, and is effective to set at 5-40° C. within 1 hour after being applied to a mold surface.

DETAILED DESCRIPTION OF THE PREFERRED EMBODIMENTS OF THE INVENTION

As used herein, when a range is given such as 5-25, that means preferably at least 5, and separately and independently, preferably not more than 25. As used herein, the term solvent refers to organic solvents. Also as used herein, the term functional silicone refers to a silicone chain, such as a siloxane chain, that has a functional group bonded to at least one of the Si atoms in the chain. For example, a hydroxy-functional silicone is a chain having at least one —OH group bonded to a Si atom in the chain; an amine-functional silicone is a chain having at least one —NH$_2$ group bonded to a Si atom in the chain; etc. Other functional groups, including alkoxy, carboxy, etc., are known in the art which can be bonded to a Si molecule in a silicone chain to provide a functional silicone as that term is used herein. Preferably, a functional silicone is at least bi-functional, meaning that there are at least two functional groups bonded to the same (preferably different) silicon atom(s) in the silicone chain. Alternatively, the functional silicone can be multi-functional (3+ functional groups). Strongly less preferred are mono-functional silicones (only 1 functional group bonded to the silicone chain).

From the above, it will be understood that as used herein and in the claims, the term hydroxy-functional denotes a hydroxyl group bonded to a silicon atom of a silicone or siloxane chain, and therefore is the same structure as silanol-functional, ie. Si—OH. Unless otherwise explicitly indicated, all percents herein are weight percents.

A water based mold release agent is provided. The invented mold release agent preferably has an amine-functional silicone and a hydroxy-functional silicone, and is a water-based silicone emulsion. The invented mold release agent preferably includes the following components listed in Table 1. Additional components not listed in Table 1 may also be included in the mold release agent according to the invention, as will become more apparent below. All figures in Table 1 are weight percents. In Table 1, any less preferred or more preferred concentration or range for any one component can be combined with any other less preferred or more preferred concentration or range of any of the other components to provide the mold release agent; it is not required that all of the concentrations or ranges for all of the components come from the same column.

TABLE 1

Composition of water based mold release agent

| Component | Preferred | Less Preferred | Less Preferred |
|---|---|---|---|
| Amine-functional silicone | 0.045-0.06<br>0.03-0.075<br>0.029-0.1 | 0.027-0.2<br>0.024-0.5<br>0.021-0.8 | 0.018-1<br>0.015-1.5<br>0.003-2 |
| Hydroxy-functional silicone | 0.01-0.015<br>0.009-0.018<br>0.008-0.1 | 0.008-0.2<br>0.007-0.5<br>0.006-0.8 | 0.005-1<br>0.004-1.5<br>0.001-2 |
| Slip agent | 0.3-1 | 0.2-1.5 | 0-2 |

Preferably, the silicones used in the present invention (e.g. amine- and hydroxy-functional silicones) are siloxanes, and have a molecular weight in the range of 1,000-70,000, less preferably 1,000-100,000, less preferably 1,000-300,000, less preferably 1,000-500,000, less preferably 1,000-700,000, less preferably 1,000-1,000,000, less preferably 1,000-1,500,000, less preferably 1,000-2,000,000. Preferably, the mold release agent according to the invention has 1.5-2, less preferably 1-2.5, less preferably 0.8-2.8, less preferably 0.5-3, less preferably 0.4-5, less preferably 0.1-10, weight percent total nonvolatile solids, and a pH of 8-8.5, less preferably 7-8.8, less preferably 6-9, less preferably 5-9.2, less preferably 4.5-9.5, less preferably 4-10. With respect to nonvolatile solids content, the amount of solids is selected based on the type of molded part requiring mold release. Lower solids content, such as about 0.2%, can be used for easier release, whereas higher solids content, typically 5-10%, may be used to meet high performance requirements.

The most preferred amine-functional silicone source is GP-50-A, available from Genesee Polymers Corp. GP-50-A is a water-based emulsion containing an amine-functional silicone (CAS No. 71750-80-6) in an amount of about or less than 3 weight percent. When GP-50-A is used, one must take into account the concentration of amine-functional silicone present in GP-50-A and perform the appropriate calculation in order to supply the correct amount of GP-50-A to ensure the correct weight percent of amine-functional silicone from Table 1. This calculation is well within the level of ordinary skill in the art. The most preferred hydroxy-functional silicone source is SEM500, available from Silchem, Inc. SEM500 is a water-based emulsion containing a hydroxy-functional silicone (CAS No. 556-67-2) in an amount of about or less than 1 weight percent. When SEM500 is used, a similar calculation must be performed as described above to provide the appropriate amount of hydroxy-functional silicone from Table 1.

Though GP-50-A and SEM500 are preferred for supplying the amine- and hydroxy-functional silicones respectively, other amine- and hydroxy-functional silicones can be used from other suitable non-solvent based sources or emulsions.

The slip agent from Table 1 most preferably is or includes nonfunctional siloxanes which can be straight-chain or branched. Alternatively, the slip agent can be one or a combination of functional siloxanes, where the functional groups are selected so as not to interfere with the film-forming or cross-liking mechanisms of the amine- and hydroxy-functional silicones, which are described in detail below. For example, such non-reactive functional groups include aromatics, vinyl groups, and alkane groups such as methyl, ethyl, propyl, etc. Less preferably, other known or conventional slip agents can be used.

In addition to the components listed in Table 1, the invented mold release agent also can be provided with other components to achieve desired physical and/or chemical characteristics, which components could be selected by a person having ordinary skill in the art without undue experimentation based on the particular characteristic desired, and may include emulsifiers, wetting agents, surfactants, solubilizers, organic or inorganic acids or bases to regulate pH, other silicones or siloxanes, etc.

Preferably, the invented water based mold release agent is prepared from the above-mentioned preferred formulations and water by blending the components at ambient temperature, e.g. 5-40, preferably 22-27, preferably about 25°, C. GP-50-A is a white opaque liquid having a mild odor, a specific gravity of 0.99, and a boiling point of 100° C. It is dispersible in water and has no flash point. SEM500 is an odorless white liquid having a boiling point of 100° C., a freezing point of 0° C. and a specific gravity of 1.0. It is soluble in water (at 20° C.).

When GP-50-A and SEM500 are both used to supply the amine- and hydroxy-functional silicones, the mold release agent according to the invention most preferably has the following composition 1.82 weight percent GP-50-A;

1.43 weight percent SEM500; and balance water (tap water is acceptable).

The above composition corresponds to about 0.055 weight percent amine-functional silicone and about 0.014 weight percent hydroxy-functional silicone, taking into account the respective silicone concentrations in GP-50-A and SEM500. This composition has about 1.92 weight percent total non-volatile solids, a pH of 8.36 and no flash point. Mean particle size for nonvolatiles has been measured at 0.09-1.06 µm.

When GP-50-A and SEM500 are used according to a preferred embodiment of the invention, the following components are also supplied in addition to the amine- and hydroxy-functional silicones: an emulsifier, a wetting agent and an emulsion solubilizer. Each of these three components falls within the broad category of surfactants, the emulsifier having an HLB (hydrophile-lipophile balance) number in the range 8-18, the wetting agent having an HLB number in the range 7-9, and the solubilizer having an HLB number in the range 15-18. The resulting composition is an oil-in-water emulsion which, when applied to a mold surface, coalesces on the surface to produce a thin film having a thickness of less than about 1 micron. The coalescence and film formation mechanisms are described in greater detail below. The wetting agent facilitates uniform coating onto the mold surface, though some excess may need to be wiped away following a heavy coating of the mold release agent. Hydroxyl triazine (supplied in GP-50-A as less than about 0.5 weight percent hexahydro-1,3,5-tris(2-hydroxyethyl)-S-triazine, CAS No. 004-719-04-4) is provided in the mold release agent composition and is effective to promote or assist room temperature film formation as described below. The solubilizer provides freeze-thaw stability to the mold release agent, preferably sufficient to withstand three or more freeze/thaw cycles which may occur as a result of shipping or storage as during winter months.

Less preferably, amine- and hydroxy-functional silicones can be used from other sources, so long as suitable surfactants and/or wetting agents are also included to achieve effective wetting of the mold surface, as well as effective silicone dispersion in the water carrier phase. Suitable surfactants and wetting agents are conventional in the art, or could be determined by a person of ordinary skill in the art without undue experimentation. Less preferably, other functional silicones could be used, e.g. alkoxy-functional silicones, carboxy-functional silicones and mixtures or combinations thereof.

As will be apparent from the above description, the mold release agent according to the invention preferably is prepared as a mixture of two pre-emulsions; an amine-functional siloxane emulsion (preferably GP-50-A), and a hydroxy-functional siloxane emulsion (preferably SEM500). Preferably, the amine-functional siloxane emulsion contains the triazine reagent described above (as does GP-50-A). Also preferably, the hydroxy-functional siloxane emulsion contains ethoxylated and octylphenoxy types of surfactants (as does SEM500, which includes 1-5% octylphenoxypolyethoxyethanol, CAS No. 9002-93-1, and 1-5% ethoxylated nonyl phenol, CAS No. 9061-45-9). It will be understood that when GP-50-A and SEM500 are not used, the components listed above may be separately obtained and combined via conventional techniques to provide the respective amine- and hydroxy-functional siloxane pre-emulsions, which can then be blended as otherwise described herein to provide the mold release agent according to the present invention. Care must be taken, however, to perform the appropriate calculations so the finished mold release agent includes the appropriate amount of triazine material and the above-mentioned surfactants based on their respective concentrations in the GP-50-A and SEM500 emulsions, and the relative amounts of these emulsions required to provide the appropriate concentrations of amine- and hydroxy-functional silicones as listed in Table 1 above. These calculations are well within the level of ordinary skill in the art.

The invented mold release agent has no flash point and is not flammable or combustible. The mold release agent is preferably devoid or substantially devoid of VOCs. Therefore, the invented water based mold release agent does not present any significant health or safety hazards, either in use or in transport. For example, the invented water based mold release agent preferably can be shipped via standard carriers or even by mail without arranging special shipping due to the presence of dangerous VOCs or other dangerous properties, such as high flammability and low flash point which are characteristic of solvent based mold release agents.

The invented water based mold release agent preferably is coated on the surface of a mold, preferably via wiping, less preferably spraying, and sets at ambient temperature (5-40, preferably 22-27, preferably about 25°, C.) within 48, preferably 24, preferably 16, preferably 12, preferably 8, preferably 6, preferably 4, preferably 2, preferably 1, preferably 0.5, preferably 0.25, hours. After the invented mold release agent is applied, it has been found that water will evaporate at a satisfactory rate (i.e. within the time periods stated above) at room temperature without the addition of a volatilizer such as alcohol. This is an important benefit because molding of certain polymer resins particularly polyester molding) is carried out at room temperature, and therefore most molds are not equipped with heating elements that could be used to set or cure the mold release agent. In addition, because molding is carried out at room temperature, the molds themselves typically are not designed to withstand thermal cycling and could become brittle or even crack if cyclically heated to set the mold release agent after application.

The invented mold release agent provides effective release (demolding of molded parts) while maintaining high gloss for both the mold surface and the molded parts. This result is achieved via a dual-mode process. The first mode is film formation: Once the release agent is applied to the mold surface, the water phase (which is the bulk fluid phase) begins to evaporate. As the water evaporates, adjacent siloxane micelles in the release agent collide as their fluid medium is diminished. These collisions result in siloxane coalescence which generates a siloxane matrix in the form of a film on the mold surface. This matrix is bound to the mold surface via the functional groups (preferably amine-functional and hydroxy-functional groups) of those siloxane molecules located nearest to the mold surface. This film-formation process occurs relatively quickly compared to curing (described below), preferably within 10-60 minutes. As used herein and in the claims, the mold release agent is understood to "set" as mentioned in the preceding paragraph when the just-described film formation process (via micelle coalescence) is substantially complete at the mold surface, preferably within about 15 minutes (0.25 hours) after application of the mold release agent at room temperature.

The second mode is curing, which is essentially cross-linking of siloxane molecules. Cross-linking proceeds relatively slowly, taking 1-8, preferably 1-4, preferably 1-2, hours. The overall process is as follows: First the film forms to provide a uniform structural matrix in which the cross-linked siloxane molecules will be supported upon curing. Next, curing occurs at a slower rate, and results in a highly cross-linked siloxane filled coalescent silicone matrix film layer adhered to the mold surface. The combination of the coalescent matrix film layer and the interspersed cross-linked siloxanes provides a highly effective mold release layer at the mold surface that provides excellent mold release characteristics for multiple successive molded parts following the initial application of the mold release agent. High gloss of both the mold surface and the surfaces of molded parts is also achieved. It has been found that both the mold surface and the surfaces of molded parts exhibit a gloss rating above 80 specular gloss units according to ASTM D523-89(1999) (described below).

Preferably, the invented mold release agent is applied to a mold surface as follows. For initial application, i.e. to a virgin mold surface or one that recently has been cleaned, the mold release agent is preferably applied by wiping (less preferably spraying) multiple coats onto the mold surface. Preferably, when applied by wiping, the mold release agent is applied using a soft cloth that has been dampened with the mold release agent. The mold surface is then wiped uniformly to provide a coat of the mold release agent. Following awaiting period (preferably 5-60, preferably 10-30, preferably about 15, minutes), a dry soft cloth is used to wipe away excess mold release agent from the mold surface. Then a second coat is applied with the damp cloth as before. Again, following the waiting period, the excess is wiped away and the process is repeated. For initial application, this process is repeated to provide preferably 2-10, preferably 3-8, preferably 4-6, coats of mold release agent to the mold surface. After a number of releases, preferably 10, 20, 30, 40, 50 or more releases, a touch up coat of the mold release agent can be applied if release performance is diminished, for example if release becomes difficult. For a touch up coat, preferably only one coat of the mold release agent is applied as described above. However, 2, 3, or 4 coats can be applied for a touch-up coat if necessary. The interval and number of mold release agent coats for the touch-up coats is determined by the particular mold (e.g. size of molded part and material) to provide continued effective mold release and high gloss.

In addition to successful mold release, the invented water based mold release agent also resulted in molded parts (and the mold surface) having high gloss even after multiple successive releases following extended periods of storage. The following examples are illustrative. In these examples, gloss was measured according to ASTM D523-89(1999) Standard Test Method for Specular Gloss (incorporated herein by reference), and is reported in standard specular gloss units whose scale ranges from 0-100. Above 70 gloss units is considered glossy, and values 70 or below are considered semi-gloss.

EXAMPLES

Example 1

Five mold release agent compositions according to the invention were prepared as described above, having the following compositions listed in Table 2:

TABLE 2

Compositions of Mold Release Agents Nos. 1-5 for Release Experiment

| Component | Agent 1 | Agent 2 | Agent 3 | Agent 4 | Agent 5 |
|---|---|---|---|---|---|
| GP-50-A | 1.82 | 1.82 | 2.27 | 2.73 | 3.64 |
| SEM500 | 1.43 | 2.0 | — | — | — |
| SM2245 | — | — | 2.0 | 2.0 | 2.0 |
| Water | Balance | Balance | Balance | Balance | Balance |
| Corresponding chemical compositions | | | | | |
| Amine-functional silicone (CAS No. 71750-80-6) | 0.055 | 0.055 | 0.07 | 0.082 | 0.11 |
| Hydroxy-functional silicone (CAS No. 556-67-2) | 0.014 | 0.02 | — | — | — |

TABLE 2-continued

Compositions of Mold Release Agents Nos. 1-5 for Release Experiment

| Component | Agent 1 | Agent 2 | Agent 3 | Agent 4 | Agent 5 |
|---|---|---|---|---|---|
| Hexahydro-1,3,5-tris(2-hydroxyethyl)-S-triazine | 0.009 | 0.009 | 0.0113 | 0.014 | 0.018 |
| Dimethhyl polysiloxane silanol (CAS No. 70131-67-8) | — | — | 0.9 | 0.9 | 0.9 |
| Polymethylhydrogen siloxane (CAS No. 63148-57-2) | — | — | 0.06 | 0.06 | 0.06 |
| Octylphenoxypoly-ethoxyethanol | 0.043 | 0.06 | — | — | — |
| Ethoxylated nonyl phenol | 0.043 | 0.06 | — | — | — |

Table 2 first lists the names and proportions of the commercial formulations used to prepare each of the five mold release agents (Agents 1-5). Second, the resulting chemical compositions are provided under the heading "Corresponding chemical compositions." In Table 2, italicized values are estimates based on the published compositions of the respective commercial formulations. GP-50-A and SEM500 have compositions as already described above. SM2245 is a silicone emulsion available from GE Silicones having the following reported composition: 1-5% propylene glycol, <1% formaldehyde, 30-60% dimethyl polysiloxane silanol (a hydroxy-functional siloxane), 1-5% vinyl alcohol, and 1-5% polymethylhydrogen siloxane, balance water.

Each of the release agents listed in Table 2 was applied via wiping to a mold surface used to mold gelcoat (polypropylene/polystyrene) parts at low temperature (below 80° C.). First, the mold surface was cleaned by conventional techniques. Then an initial application (film) of the mold release agent was applied as follows: wiping on a coating, waiting about 15 minutes to allow the water to evaporate, and then wiping away excess material from the surface. This procedure was repeated 2-6 times for each mold depending on the condition of the mold surface. The resulting mold release film was allowed to cure for 30 minutes. Next, twenty successive gelcoat parts were molded using the treated mold surface and then released (demolded). No touch up coat of mold release agent was applied between any of the successively molded/demolded parts. Specular gloss for both the molded part surface and the mold surface were measured according to ASTM D523-89(1999). Ease of release was also measured based on a scale from 1-6 where the following release values correspond roughly to the stated amount of release force necessary to facilitate demolding a finished molded:

6—release force of 0-0.005 N/cm² (mold and molded part undamaged following release)
5—release force of 0.005-0.15 N/cm² (mold and molded part undamaged following release)
4—0.15-0.35 N/cm² (mold and molded part undamaged following release)
3—greater than 0.35 N/cm² (mold and molded part undamaged following release)
2—greater than 0.35 N/cm² (molded part damaged or broken during release)
1—greater than 0.35 N/cm² (total failure; mold damaged or broken during release)

Specular gloss performance for the mold release agents according to the invention was compared to that obtained using the conventional solvent-based room temperature cured mold release agent, WOLO™, which is well known in the art and is available from Henkel Loctite Corporation. The results are listed below in Tables 3-5. In Tables 3-4, values are standard specular gloss units (scale 0-100) from ASTM D523-89 (1999), and in Table 5, values are in the above-described release quality scale of 1-6.

TABLE 3

Specular gloss of mold surface for Agents 1-5 for twenty successively molded and released gelcoat parts

| Release No. | Agent 1 | Agent 2 | Agent 3 | Agent 4 | Agent 5 | WOLO ™ |
|---|---|---|---|---|---|---|
| Bare mold surface (no mold release agent) | 96.3 | 96.2 | 94 | 94.4 | 96 | 94.7 |
| 1 | 92.9 | 91.2 | 94 | 91.8 | 89 | 80.3 |
| 2 | 94.3 | 90.2 | 89 | 88.1 | 89.9 | 75.6 |
| 3 | 92.9 | 90.9 | 81 | 89.3 | 86.5 | 74.3 |
| 4 | 92.1 | 93 | 85.5 | 83.3 | 84.2 | 69.7 |
| 5 | 93.9 | 91.6 | 84 | 80.3 | 78.8 | 65.8 |
| 6 | 83.6 | 91 | 83.6 | 77.1 | 74.7 | 68.3 |
| 7 | 91.9 | 90.2 | 83.2 | 67.7 | 73.9 | 64.3 |
| 8 | 87.8 | 88.4 | 83.4 | 75 | 81.4 | 56 |
| 9 | 91.9 | 88.4 | 82.6 | 77.6 | 76.1 | 56.2 |
| 10 | 89.6 | 89.8 | 78.5 | 73.7 | 80.2 | 57.7 |
| 11 | 92.2 | 86.2 | 81.2 | 70.8 | 75.6 | 58.1 |
| 12 | 81.5 | 79.4 | 86.5 | 75 | 70.2 | 55.6 |
| 13 | 82.1 | 84 | 79.2 | 64.9 | 74.1 | 52.9 |
| 14 | 84.3 | 83.4 | 85.9 | 74 | 75.8 | 53.4 |
| 15 | 87.1 | 80.3 | 72.7 | 66.3 | 71.4 | 50.8 |
| 16 | 90.2 | 83.8 | 84.1 | 73 | 75.2 | 48.9 |
| 17 | 88.2 | 81.9 | 82.8 | 65.4 | 76.2 | 49.2 |
| 18 | 84.8 | 82.6 | 79.1 | 67.3 | 69.7 | 47.6 |
| 19 | 86.4 | 85 | 80.6 | 66.6 | 68 | 42.1 |
| 20 | 89.3 | 85.2 | 78 | 63.2 | 73.4 | 44.2 |
| Average = | 88.8 | 86.8 | 82.7 | 74.5 | 77.2 | 58.5 |
| Last 5 avg = | 87.8 | 83.7 | 80.9 | 67.1 | 72.5 | 46.4 |

TABLE 4

Specular gloss of molded part surfaces for Agents 1-5 for twenty successively molded and released gelcoat parts

| Release No. | Agent 1 | Agent 2 | Agent 3 | Agent 4 | Agent 5 | WOLO ™ |
|---|---|---|---|---|---|---|
| 1 | 87.8 | 84.7 | 85.2 | 84.4 | 80.9 | 86.9 |
| 2 | 92.9 | 87.6 | 85.3 | 81.9 | 88.4 | 84 |
| 3 | 89.3 | 86.7 | 84.5 | 87.2 | 86.3 | 81.3 |
| 4 | 92.8 | 92.4 | 86.5 | 82.7 | 88 | 81.5 |
| 5 | 93.1 | 88.2 | 85.4 | 82.7 | 81.8 | 73.1 |
| 6 | 92.9 | 91.3 | 85.5 | 80 | 67.3 | 74.5 |
| 7 | 90.6 | 92.1 | 84.4 | 75.3 | 71 | 70.9 |
| 8 | 91.1 | 87 | 83.3 | 78.4 | 81.6 | 62.7 |
| 9 | 92.2 | 91 | 84.3 | 75.5 | 78.6 | 61.8 |
| 10 | 91.9 | 91.7 | 81.5 | 75.2 | 78.6 | 62 |
| 11 | 92.1 | 86.3 | 82.7 | 73.5 | 81.1 | 64.5 |
| 12 | 91.1 | 88.2 | 81.5 | 71.5 | 75.4 | 58.5 |
| 13 | 89.1 | 92.5 | 82.8 | 65.8 | 81.9 | 60.4 |
| 14 | 90.9 | 91.4 | 85 | 70.2 | 84.9 | 61.8 |
| 15 | 87.1 | 84.1 | 79.7 | 68.4 | 71.4 | 54.1 |
| 16 | 88.1 | 86.2 | 81.4 | 71.5 | 73.1 | 57.7 |
| 17 | 88.7 | 80.6 | 80.3 | 67.3 | 61.9 | 52.9 |
| 18 | 91.9 | 89.6 | 84.8 | 67.6 | 70.2 | 51.7 |
| 19 | 90.4 | 84.5 | 81.1 | 70.7 | 74.9 | 51.1 |
| 20 | 88.1 | 88.4 | 74.2 | 69.6 | 67.7 | 47.6 |
| Average = | 90.6 | 88.2 | 83.0 | 75.0 | 77.2 | 64.9 |
| Last 5 avg = | 89.4 | 85.9 | 80.4 | 69.3 | 69.6 | 52.2 |

TABLE 5

Release quality for Agents 1-5 for twenty successively molded and released gelcoat parts

| Release No. | Agent 1 | Agent 2 | Agent 3 | Agent 4 | Agent 5 | WOLO ™ |
|---|---|---|---|---|---|---|
| 1 | 5 | 5 | 5 | 5 | 6 | 6 |
| 2 | 5 | 5 | 5 | 5 | 5 | 6 |
| 3 | 4 | 6 | 5 | 5 | 5 | 6 |
| 4 | 5 | 5 | 6 | 5 | 5 | 6 |
| 5 | 5 | 5 | 5 | 4 | 5 | 6 |
| 6 | 5 | 5 | 5 | 4 | 5 | 6 |
| 7 | 4 | 5 | 4 | 4 | 4 | 5 |
| 8 | 5 | 5 | 4 | 5 | 5 | 5 |
| 9 | 5 | 5 | 5 | 5 | 5 | 6 |
| 10 | 4 | 4 | 4 | 4 | 4 | 5 |
| 11 | 5 | 5 | 5 | 4 | 5 | 5 |
| 12 | 5 | 5 | 5 | 5 | 5 | 5 |
| 13 | 4 | 5 | 5 | 5 | 5 | 5 |
| 14 | 4 | 4 | 5 | 4 | 5 | 5 |
| 15 | 5 | 5 | 5 | 4 | 4 | 5 |
| 16 | 4 | 4 | 5 | 4 | 4 | 5 |
| 17 | 4 | 4 | 4 | 4 | 4 | 6 |
| 18 | 5 | 5 | 5 | 5 | 4 | 5 |
| 19 | 5 | 5 | 5 | 4 | 4 | 5 |
| 20 | 5 | 5 | 4 | 4 | 5 | 5 |
| Average = | 4.6 | 4.8 | 4.8 | 4.8 | 4.7 | 5.4 |
| Last 5 avg = | 4.6 | 4.6 | 4.6 | 4.6 | 4.2 | 5.2 |

From the data in Tables 3-4, one can see that the mold release agents (Agents 1-5) according to the invention resulted in substantially superior specular gloss results for both the mold surface and the surfaces of successively molded parts over twenty consecutive moldings and releases. In particular, Agents 1-5 resulted in substantially superior specular gloss for both the mold surface and the surfaces of molded gelcoat parts for the last five releases (release nos. 16-20. This demonstrates the superior efficacy of the non-solvent-based mold release agents according to the invention to provide superior gloss following a large number of mold releases after only an initial application of the mold release agent. In addition to superior gloss characteristics, Agents 1-5 provided comparable mold release performance to the conventional WOLO™ solvent-based agent.

Example 2

Mold release agents 1, 2, 3 and 5 from Table 2 of Example 1 above were subjected to an experiment measure release and specular gloss performance following one year of shelf life. Each of these agents was prepared and then placed in an oven and maintained at a constant temperature of 45-46° C. It has been found that one day of storage at this temperature results in comparable aging (such as by decomposition) to about 9 days of storage under ambient conditions. Thus, 40 days of storage at this temperature was used to simulate one year of shelf storage. Results are provided in Tables 6, 7 and 8 below. Values in Tables 6-8 are reported in the same units as in Tables 3-5 respectively.

TABLE 6

Specular gloss of mold surface for Agents 1, 2, 3, and 5 for twenty successively molded and released gelcoat parts after 1-year shelf life

| Release No. | Agent 1 | Agent 2 | Agent 3 | Agent 5 |
|---|---|---|---|---|
| 1 | 89 | 91.8 | 87.2 | 87.1 |
| 2 | 84.5 | 92.4 | 87.2 | 86.2 |
| 3 | 86.1 | 90.9 | 85.1 | 85.4 |
| 4 | 86 | 91.5 | 83.3 | 84.1 |
| 5 | 82.4 | 86.8 | 80.7 | 81.2 |
| 6 | 84.3 | 87.1 | 81.3 | 83.9 |
| 7 | 84.6 | 89.8 | 81.9 | 84 |
| 8 | 83.9 | 89.3 | 81.9 | 82.7 |
| 9 | 88.8 | 91.2 | 84 | 83.8 |
| 10 | 86 | 90.8 | 84 | 86 |
| 11 | 83.3 | 88.4 | 82.5 | 81.5 |
| 12 | 84.8 | 88.8 | 80.1 | 81.2 |
| 13 | 88 | 89.4 | 82.4 | 84.8 |
| 14 | 85.3 | 88 | 82 | 82.6 |
| 15 | 87.7 | 89.9 | 81 | 82 |
| 16 | 84.1 | 89.1 | 80.5 | 80.8 |
| 17 | 84.2 | 88.4 | 81.8 | 82.7 |
| 18 | 85.1 | 88.4 | 81.1 | 82 |
| 19 | 83 | 85.6 | 79 | 80.7 |
| 20 | 87.5 | 89.7 | 85.5 | 83.4 |
| Average = | 85.4 | 89.4 | 82.6 | 83.3 |
| Last 5 avg = | 84.8 | 88.2 | 81.6 | 81.9 |

TABLE 7

Specular gloss of molded part surfaces for Agents 1, 2, 3, and 5 for twenty successively molded and released gelcoat parts after 1 year shelf life

| Release No. | Agent 1 | Agent 2 | Agent 3 | Agent 5 |
|---|---|---|---|---|
| 1 | 82.9 | 82.3 | 80.3 | 78.9 |
| 2 | 89.7 | 89.6 | 86.5 | 83.9 |
| 3 | 90.1 | 90.7 | 87.6 | 85.9 |
| 4 | 89.7 | 92.2 | 89.1 | 89.4 |
| 5 | 84.5 | 91.1 | 86.1 | 89.2 |
| 6 | 88.9 | 90.7 | 86.9 | 87.6 |
| 7 | 89.7 | 90.8 | 87.2 | 89.3 |
| 8 | 89.3 | 90.6 | 87 | 88.9 |
| 9 | 89.6 | 90.6 | 86.7 | 88.8 |
| 10 | 89.4 | 90.6 | 86.7 | 86.6 |
| 11 | 87.6 | 88.7 | 84.6 | 86.7 |
| 12 | 87.4 | 90 | 85.1 | 86.6 |
| 13 | 88 | 89.4 | 85.5 | 85.9 |
| 14 | 85.3 | 89.8 | 85 | 85.5 |
| 15 | 87.2 | 89.3 | 84.5 | 86.5 |
| 16 | 86 | 88.8 | 83.8 | 86.5 |
| 17 | 88.7 | 89.4 | 87.3 | 88.5 |
| 18 | 87.5 | 88.3 | 85.5 | 86.8 |
| 19 | 88.8 | 89.6 | 85.2 | 85.9 |
| 20 | 89.5 | 91.2 | 87.9 | 86 |
| Average = | 88.0 | 89.7 | 85.9 | 86.7 |
| Last 5 avg = | 88.1 | 89.5 | 85.9 | 86.7 |

TABLE 8

Release quality for Agents 1, 2, 3, and 5 for twenty successively molded and released gelcoat parts after 1 year shelf life

| Release No. | Agent 1 | Agent 2 | Agent 3 | Agent 5 |
|---|---|---|---|---|
| 1 | 4 | 4 | 5 | 5 |
| 2 | 5 | 5 | 4 | 5 |
| 3 | 5 | 4 | 5 | 5 |
| 4 | 5 | 5 | 5 | 5 |
| 5 | 5 | 5 | 5 | 5 |
| 6 | 5 | 5 | 5 | 5 |
| 7 | 5 | 5 | 5 | 5 |
| 8 | 5 | 5 | 5 | 5 |
| 9 | 5 | 5 | 5 | 5 |
| 10 | 5 | 5 | 5 | 5 |
| 11 | 5 | 5 | 5 | 5 |
| 12 | 5 | 4 | 5 | 4 |

TABLE 8-continued

Release quality for Agents 1, 2, 3, and 5 for twenty successively
molded and released gelcoat parts after 1 year shelf life

| Release No. | Agent 1 | Agent 2 | Agent 3 | Agent 5 |
|---|---|---|---|---|
| 13 | 5 | 4 | 5 | 5 |
| 14 | 4 | 4 | 5 | 4 |
| 15 | 5 | 4 | 5 | 4 |
| 16 | 4 | 4 | 4 | 4 |
| 17 | 4 | 4 | 4 | 4 |
| 18 | 5 | 4 | 5 | 4 |
| 19 | 5 | 5 | 5 | 5 |
| 20 | 5 | 5 | 4 | 5 |
| Average = | 4.8 | 4.5 | 4.5 | 4.7 |
| Last 5 avg = | 4.6 | 4.4 | 4.4 | 4.4 |

Comparing the data in Tables 6-8 with the analogous data in Tables 3-5, mold release agents 1, 2, 3, and 5 from Table 1 exhibited virtually no decline in performance following a simulated one year shelf life. The invented mold release agent's ability to provide substantially the same superior specular gloss performance following a one year shelf life as for zero shelf life was a highly surprising result.

As can be seen from the above examples, both the molded parts and the mold surface itself consistently exhibited gloss unit values above 80 even after 20 successive releases following one year (simulated) of storage of the mold release agent. This also was a highly surprising and unexpected result.

Surprisingly, the invented water based mold release agent provides comparable mold releasability, and superior gloss following multiple successive releases compared to existing solvent-based, room temperature curing mold release agents, particularly for gelcoat molded parts. Yet, the invented mold release agent is room temperature curable, is substantially devoid of VOCs, has no flash point and is substantially non-flammable and non-combustible.

Although the above described embodiments of the invention constitute the preferred embodiments, it should be understood that modifications can be made thereto without departing from the scope of the invention as set forth in the appended claims.

What is claimed is:

1. A mold release agent comprising 0.003-2 weight percent amine-functional silicone, 0.001-2 weight percent hydroxy-functional silicone, and a triazine material in a water carrier phase, and a slip agent in an amount of about or less than 2 weight percent wherein the triazine material is present in an amount effective to promote room temperature film formation from said mold release agent following application thereof to a mold surface.

2. A mold release agent according to claim 1, having a ph of 4-10.

3. A mold release agent according to claim 1, being effective to set at 5-40° C. within 48 hours after being applied to a mold surface.

4. A mold release agent according to claim 1, being substantially devoid of VOCs.

5. A mold release agent according to claim 1, having no flash point.

6. A mold release agent according to claim 1, wherein said hydroxy-functional silicone is provided from a water based emulsion.

7. A mold release agent according to claim 1, wherein said amine-functional silicone is provided from a water based emulsion.

8. A mold release agent according to claim 1, being effective to facilitate at least 10 successive effective releases of molded parts from a mold surface following initial application of said mold release agent to said mold surface.

9. A mold release agent according to claim 1, further comprising at least one component selected from the group consisting of alkoxy-functional silicones and carboxy-functional silicones.

10. A mold release agent according to claim 1, being effective to provide specular gloss to a mold surface of at least 70 specular gloss units according to ASTM D523-89 (1999) after 10 consecutive mold releases from said mold surface following initial application of said mold release agent to said mold surface.

11. A mold release agent according to claim 1, being effective to provide specular gloss to a mold surface of at least 80 specular gloss units according to ASTM D523-89 (1999) after 10 consecutive mold releases from said mold surface following initial application of said mold release agent to said mold surface.

12. A mold release agent according to claim 1, being effective to cure at 5-40° C. within 1-8 hours after being applied to a mold surface.

13. A mold release agent according to claim 1, said triazine material being present in an amount of 0.009-0.018 weight percent.

14. A mold release agent according to claim 1, said mold release having 1-2.5 weight percent non-volatile solids and comprising 0.03-0.075 weight percent amine-functional silicone, 0.009-0.1 weight percent hydroxyl-functional silicone.

15. A mold release agent according to claim 14, further comprising a wetting agent having an HLB numher of 7-9, an emulsifier having an HLB number of 8-18 and an emulsion solubilizer having an HLB number of 15-18.

16. A mold release agent according to claim 14, said triazine material being hexahydro-1,3,5-tris (2-hydroxyethyl)-S-triazine.

17. A mold release agent according to claim 1, comprising about 0.55 weight percent amine-functional silicone and about 0.014 weight percent hydroxyl-functional silicone, said triazine material being hexahydro-1,3,5-tris (2-hydroxyethyl)-S-triazine.

18. A mold release agent according to claim 17, said mold release agent having a total non-volatile solids content of 1-2.5 weight percent.

19. A mold release agent comprising 0.003-2 weight percent amine-functional silicone, 0.001-2 weight percent hydroxyl-functional silicone, and a triazine material in a water carrier phase, said mold release agent having 0.1-10 weight percent total nonvolatile solids wherein the triazine material is present in an amount effective to promote room temperature film formation from said mold release agent following application thereof to a mold surface.

20. A mold release agent according to claim 19, having a pH of 4-10.

21. A mold release agent according to claim 19, said triazine material being a hydroxyl triazine material.

22. A mold release agent according to claim 19, being effective to set at 5-40° C. within 48 hours after being applied to a mold surface.

23. A mold release agent according to claim 19, being substantially devoid of VOCs.

24. A mold release agent according to claim 19, having no flash point.

25. A mold release agent according to claim 19, being effective to facilitate at least 10 successive effective releases of molded parts from a mold surface following initial application of said mold release agent to said mold surface.

26. A mold release agent according to claim 19, further comprising at least one component selected from the group consisting of alkoxy-functional silicones and carboxy-functional silicones.

27. A mold release agent according to claim 19, being effective to provide specular gloss to a mold surface of at least 70 specular gloss units according to ASTM D523-89 (1999) after 10 consecutive mold releases from said mold surface following initial application of said mold release agent to said mold surface.

28. A mold release agent according to claim 19, being effective to provide specular gloss to a mold surface of at least 80 specular gloss units according to ASTM D523-89 (1999) after 10 consecutive mold releases from said mold surface following initial application of said mold release agent to said mold surface.

29. A mold release agent according to claim 19, said triazine material being present in an amount of 0.009-0.018 weight percent.

30. A mold release agent according to claim 19, said mold release having 1-2.5 weight percent non-volatile solids and comprising 0.03-0.075 weight percent amine-functional silicone, 0.009-0.1 weight percent hydroxyl-functional silicone.

31. A mold release agent according to claim 19, further comprising a wetting agent having an HLB number of 7-9, an emulsifier having an HLB number of 8-18 and an emulsion solubilizer having an HLB number of 15-18.

32. A mold release agent according to claim 19, said triazine material being hexahydro-1,3,5-tris (2-hydroxyethyl)-S-triazine.

33. A mold release agent comprising 0.003-2 weight percent amine-functional silicone, 0.001-2 weight percent hydroxy-functional silicone, and a triazine material in a water carrier phase, said triazine material being a hydroxy triazine material wherein the triazine material is present in an amount effective to promote room temperature film formation from said mold release agent following application thereof to a mold surface.

34. A mold release agent comprising 0.003-2 weight percent amine-functional silicone, 0.001-2 weight percent hydroxyl-functional silicone, and a triazine material in a water carrier phase, said triazine material being hexahydro-1,3,5-tris (2-hydroxyethyl)-S-triazine wherein the triazine material is present in an amount effective to promote room temperature film formation from said mold release agent following application thereof to a mold surface.

* * * * *